US011847365B1

United States Patent
Osada (10) Patent No.: US 11,847,365 B1
(45) Date of Patent: Dec. 19, 2023

(54) INFORMATION PROCESSING APPARATUS, IMAGE FORMING APPARATUS, AND WORK ESTIMATION METHOD FOR ACCURATELY ESTIMATING WORK RELATED TO PRINTING

(71) Applicant: KYOCERA Document Solutions Inc., Osaka (JP)

(72) Inventor: Yoshihiro Osada, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/970,591

(22) Filed: Oct. 21, 2022

(51) Int. Cl.
*G06F 3/12* (2006.01)

(52) U.S. Cl.
CPC ............ *G06F 3/1229* (2013.01); *G06F 3/121* (2013.01)

(58) Field of Classification Search
CPC ...... G06F 3/1229; G06F 3/121; G06F 3/1219; G06F 3/1237; G06F 3/1208
USPC .................................................. 358/1.9, 1.15
See application file for complete search history.

(56) References Cited

U.S. PATENT DOCUMENTS

| 2003/0202204 | A1* | 10/2003 | Terrill | ................... G06Q 10/087 399/24 |
| 2013/0321827 | A1* | 12/2013 | Liebelt | ..................... H04N 1/60 358/1.9 |
| 2018/0032293 | A1 | 2/2018 | Sakurai et al. | |

FOREIGN PATENT DOCUMENTS

JP        2018-015964 A        2/2018

\* cited by examiner

*Primary Examiner* — Jamares Q Washington
(74) *Attorney, Agent, or Firm* — Hawaii Patent Services; Nathaniel K. Fedde; Kenton N. Fedde (57) ABSTRACT

Provided is an information processing apparatus that accurately estimates printing jobs. A data acquisition unit acquires a job for estimation. A unit estimation unit calculates an estimation of the work for each specific unit of the job acquired by the data acquisition unit. An estimation analysis unit detects repetition and a period of the repetition from the estimation of the work for the specific unit at the time calculated by the unit estimation unit. The entire estimation unit estimates an estimation of the work of the entire job based on the repetition and the period detected by the estimation analysis unit. The estimation presentation unit presents the estimation of the work calculated by the entire estimation unit.

15 Claims, 9 Drawing Sheets

| Input size | 40 | 41 | 42 | 43 | 44 | 45 | 46 | 47 | 48 | 49 | 50 | 51 | 52 | 53 | 54 | 55 | 56 | 57 | 58 | 59 | 60 | 61 |
|---|---|---|---|---|---|---|---|---|---|---|---|---|---|---|---|---|---|---|---|---|---|---|
| Detected period | 20 | 20 | 20 | 20 | 20 | 20 | 20 | 20 | 20 | 20 | 20 | 20 | 20 | 20 | 20 | 20 | 20 | 20 | 20 | 20 | 20 | 20 |
| Proposed size | 40 | 40 | 40 | 40 | 40 | 40 | 40 | 40 | 40 | 40 | 40 | 40 | 40 | 40 | 40 | 40 | 40 | 40 | 40 | 40 | 60 | 60 |

FIG. 9

INFORMATION PROCESSING APPARATUS, IMAGE FORMING APPARATUS, AND WORK ESTIMATION METHOD FOR ACCURATELY ESTIMATING WORK RELATED TO PRINTING

BACKGROUND

The present disclosure particularly relates to an information processing apparatus, an image forming apparatus, and a work estimating method for estimating work related to production printing.

In industrial printing called production printing, which uses a commercial (industrial) printing apparatus, the composing members of the final product are produced by dividing the work into a plurality of processes. For example, in the case of bookbinding, a cover, a body (color), a body (black and white), promotional item(s), a band, a shipping envelope, or the like, are processed as different jobs. Then, in the middle of the process, each job is combined and finished as a book as the final product.

In industrial printing, there is an image forming apparatus such as a digital printer and a multifunctional peripheral (MFP) that print printed matter.

When performing a large amount of printing with the image forming apparatus, for each job, a process of estimating how much consumables such as toner and ink, printing time, or the like, are consumed should be performed (hereinafter, referred to as "estimation of work related to printing"). However, since the amount of consumables to be consumed and the printing time, or the like, differ for each page during printing, in fact, the pages are required to be drawn (rasterized) to calculate the estimation.

As a typical technique, a method for estimating the amount of ink consumed when printing is performed by an inkjet printing apparatus with higher accuracy than before is disclosed. In this technique, after acquiring a print job, adjustment data is acquired based on job information included in the print job. After determining the estimated range, the adjustment data is used to correct the image data to be printed. Then, the amount of ink expected to be consumed by printing the image represented by the corrected image data is calculated. Further, when flushing is performed, the amount of ink expected to be consumed by flushing is calculated.

SUMMARY

An information processing apparatus according to the present disclosure is an information processing apparatus performing estimation of work related to printing, including: a data acquisition unit that acquires a job for estimation; a unit estimation unit that calculates an estimation of the work for each specific unit of the job acquired by the data acquiring unit; an estimation analysis unit that detects repetition and a period of the repetition from the estimation of the work for the specific unit at the time calculated by the unit estimation unit; an entire estimation unit that estimates an estimation of the work for the entire job based on the repetition and the period detected by the estimation analysis unit; and an estimation presentation unit that presents the estimation of the work calculated by the entire estimation unit.

An image forming apparatus according to the present disclosure is an image forming apparatus for estimating work related to printing, including: a data acquisition unit that acquires a job for estimation; a unit estimation unit that calculates an estimation of the work for each specific unit of the job acquired by the data acquiring unit; an estimation analysis unit that detects repetition and a period of the repetition from the estimation of the work for the specific unit at the time calculated by the unit estimation unit; an entire estimation unit that estimates an estimation of the work for the entire job based on the repetition and the period detected by the estimation analysis unit; and an estimation presentation unit that presents the estimation of the work calculated by the entire estimation unit.

A work estimation method according to the present disclosure is a work estimation method executed by an information processing apparatus for estimating work related to printing, including the steps of: acquiring a job for estimation; calculating an estimation of the work for each specific unit of the job; detecting repetition and a period of the repetition from the estimation of the work for the specific unit at the calculated time; estimating an estimation of the work for the entire job based on the detected repetition and the period; and presenting the calculated estimation of the work.

DETAILED DESCRIPTION

Embodiment

[System Configuration of Image Forming Apparatus 1]

Figure 1:
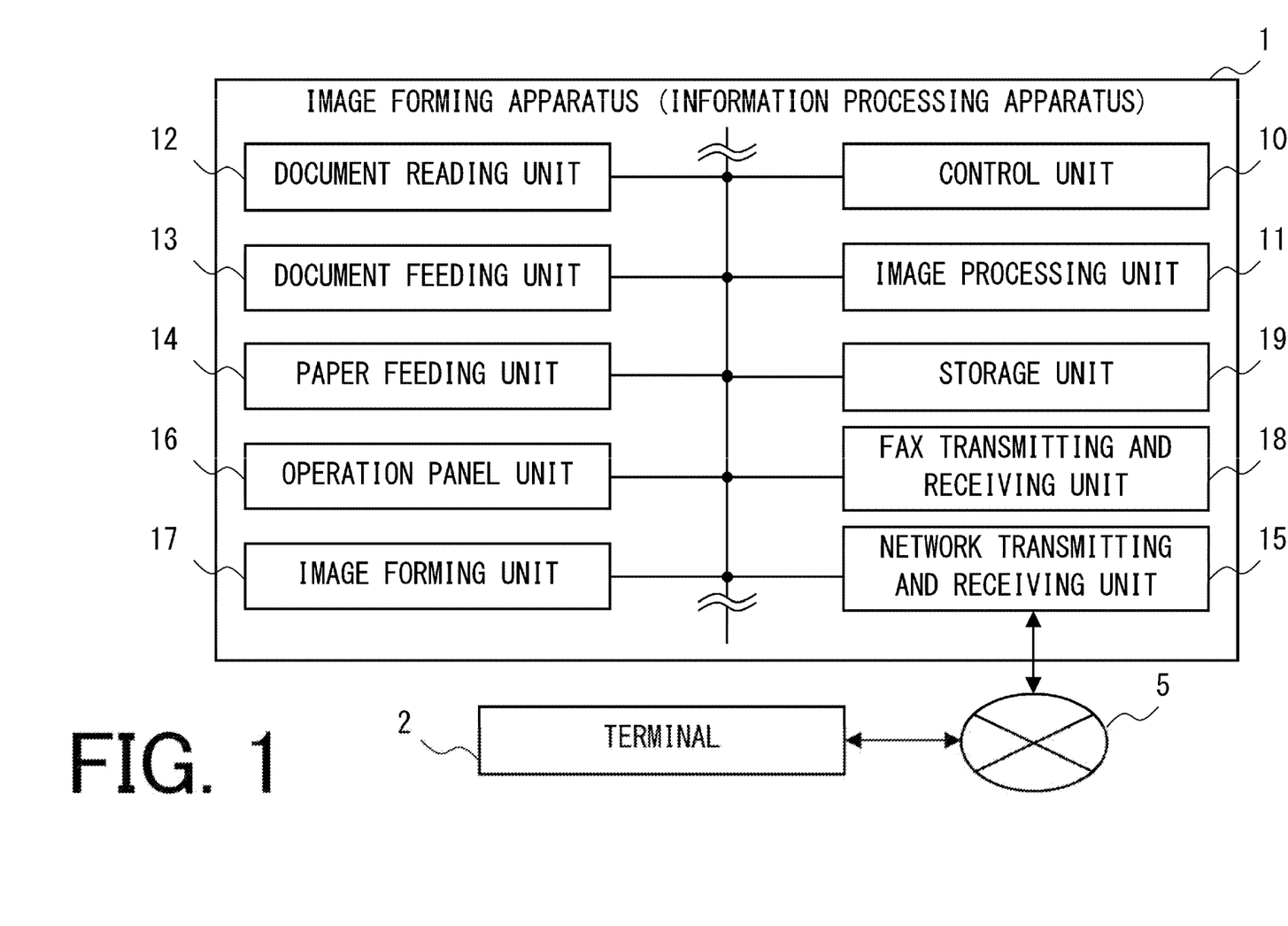
FIG. 1 is a block diagram showing the system configuration of an image forming apparatus according to an embodiment of the present disclosure.

Firstly, with reference to FIG. 1, a system configuration of an image forming apparatus 1 is described.

The image forming apparatus 1 is an example of an information processing apparatus according to the present embodiment that estimates work related to printing according to instructions from a user such as a print shop clerk. In the example according to the present embodiment, the image forming apparatus 1 is an MFP that performs digital printing, and it estimates the consumption amount of consumables such as toner and ink as an estimation of the work.

Here, the image forming apparatus 1 is connected with a terminal 2 via a network 5.

Figure 2:
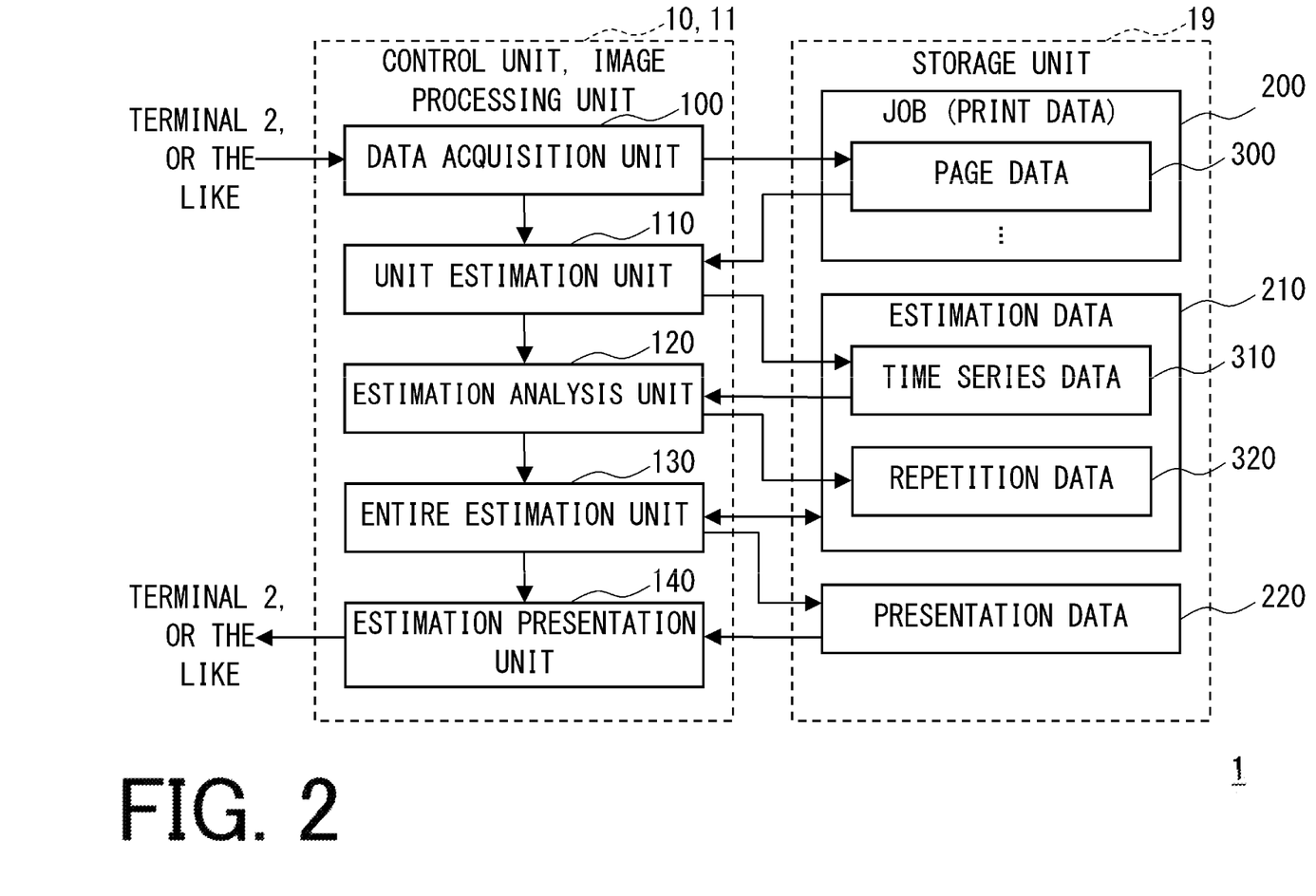
FIG. 2 is a block diagram showing the functional configuration of the image forming apparatus according to the embodiment of the present disclosure.

The terminal 2 is an example of an apparatus for the user to instruct the image forming apparatus 1 to estimate the work of the job 200 (FIG. 2). The terminal 2 is, for example, a PC (Personal Computer), a smart phone, a dedicated terminal, or the like.

The network 5 is, for example, a LAN, a wireless LAN, a WAN, a mobile phone network, a voice phone network, or the like.

In this embodiment, the image forming apparatus 1 includes a control unit 10, an image processing unit 11, a document reading unit 12, a document feeding unit 13, a paper feeding unit 14, a network transmitting and receiving unit 15, an operation panel unit 16, and an image forming unit 17, a FAX transmitting and receiving unit 18, a storage unit 19, and the like. Each unit is connected to the control unit 10 and controlled in operation by the control unit 10.

The control unit 10 is an information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, application-specific processor), or the like.

The control unit 10 reads the control program stored in the ROM or HDD of the storage unit 19, expands the control program in the RAM, and executes it, thereby operating as each unit of the function blocks as described later. In this embodiment, the control unit 10 performs to estimate the estimation of the work.

Also, the control unit 10 controls the entire apparatus according to instruction information input from the terminal 2 or the operation panel unit 16.

image processing unit 11 is control arithmetic unit such as a DSP (Digital Signal Processor) or a GPU (Graphics Processing Unit). The image processing unit 11 performs image processing on image data. This image processing may be, for example, processing such as enlargement/reduction, density adjustment, gradation adjustment, image improvement, and the like.

The image processing unit 11 can also store the image data read by the document reading unit 12 in the storage unit 19 as a job 200 (FIG. 2). At this time, the image processing unit 11 can convert the image data into an electronic document such as PDF or a file such as TIFF and store it in the job 200. Further, the image processing unit 11 may be capable of executing at least part of OCR (Optical Character Recognition) processing. In the present embodiment, the image processing unit 11 may also calculate at least part of the estimation of the work and the statistical analysis.

The document reading unit 12 is arranged on the upper part of the main body of the image forming apparatus 1 and reads a set document.

The document reading unit 12 includes a scanner, a platen glass, and a document reading slit. When reading a document placed on the platen glass, the document reading unit 12 moves the scanner to a position facing the platen glass, reads the document placed on the platen glass while scanning, acquires image data. The document reading unit 12 stores the acquired image data in the storage unit 19.

Further, when reading a document fed from the document feeding unit 13, the document reading unit 12 moves the scanner to a position facing the document reading slit. Then, the document reading unit 12 reads the document through the document reading slit in synchronization with the document feeding operation of the document feeding unit 13 to acquire image data. The document reading unit 12 stores the acquired image data in the storage unit 19.

The document feeding unit 13 conveys the document read by the document reading unit 12. The document feeding unit 13 is arranged above the document reading unit 12.

The document feeding unit 13 includes a document placing unit and a document conveying mechanism. The document feeding unit 13 feeds the documents placed on the document placing unit one by one by the document conveying mechanism and feeds them to the document reading unit 12.

The paper feeding unit 14 feeds recording papers one by one toward the image forming unit 17. The paper feeding unit 14 is provided within the main body.

The network transmitting and receiving unit 15 is a network connection unit including a LAN board, a wireless transmitting and receiving device, and the like for connecting to the terminal 2, an external server, and the like via the network 5.

The network transmitting and receiving unit 15 transmits/receives data through a data communication line, and it transmits/receives voice signals through a voice telephone line.

The operation panel unit 16 includes an input unit such as buttons, a touch panel, or the like, and a display unit such as an LCD (Liquid Crystal Display), an organic EL display, or the like. Further, the operation panel unit 16 is arranged on the front side of the image forming apparatus 1.

The buttons of the input unit of the operation panel unit 16 include a numeric pad, a start button, a cancel button, an operation mode switching button, buttons for giving instructions regarding the job 200, and the like. The operation modes may be copying, faxing, scanning, network scanning, and the like. Also, the instructions regarding the job 200 include instructions for printing, transmitting, saving, recording, or the like, for the selected document. Further, in the present embodiment, the instruction regarding the job 200 may include an instruction for performing the estimation of the work of the job 200. In addition, the information of each user can be inputted and changed according to the user's instruction acquired from the operation panel unit 16.

The image forming unit 17 forms an image on a recording paper by data stored in the storage unit 19, read by the document reading unit 12, or obtained from the terminal 2, according to a user's output instruction.

The image forming unit 17 is in the case of the dry electrophotographic type, it provides a photosensitive drum, an exposure unit, a developing unit, a transfer unit, a fixing unit, and the like. In this case, the image forming unit 17 records a toner image on a recording paper by executing an image forming process including charging, exposure, development, transfer, and fixing. Here, the image forming unit 17 can perform color printing by recording toner images of C (Cyan), M (Magenta), Y (Yellow), and K (Key plate, Black) toners.

Further, if the image forming unit 17 is in the case of the ink jet type, it is possible to record an ink image on recording paper by ejecting ink from the ink head. Also in this case, inks such as CMYK, or the like, may possibly be used.

In this embodiment, in addition, light color (neutral color) and special color toner (s) or ink (s) may be used as consumables, and the estimation of the work may be estimated as described later.

The FAX transmitting and receiving unit 18 performs facsimile transmitting and receiving. The FAX transmitting and receiving unit 18 can receive a facsimile from another FAX apparatus via a voice line, store the facsimile data in the storage unit 19, and cause the image forming unit 17 to form an image. Further, the FAX transmitting and receiving unit 18 can convert a document read by the document reading unit 12 or network FAX data transmitted from the terminal 2 into image data and facsimile transmit it to another FAX apparatus via a voice line.

The storage unit 19 is a non-transitory recording medium such as semiconductor memory as ROM (Read Only Memory) and RAM (Random Access Memory), or the like, or HDD (Hard Disk Drive), or the like.

The control program for controlling the operation of the image forming apparatus 1 is stored in the ROM or HDD of the storage unit 19. In addition, the storage unit 19 also stores user account settings. In addition, the storage unit 19 may include a storage folder area for each user.

In addition, the control unit 10 and the image processing unit 11 may be integrally formed as like a CPU having built-in GPU, a chip-on-module package, SOC (System On a Chip), or the like.

Also, the control unit 10 and the image processing unit 11 may incorporate RAM, ROM, flash memory, or the like.

[Functional Configuration of Image Forming Apparatus 1]

Here, with reference to FIG. 2, the functional configuration of the image forming apparatus 1 is described.

The control unit 10 of the image forming apparatus 1 includes a data acquisition unit 100, a unit estimation unit 110, an estimation analysis unit 120, an entire estimation unit 130 and an estimation presentation unit 140.

The storage unit 19 stores a job 200, estimation data 210 and presentation data 220.

A data acquisition unit 100 acquires a job 200 for estimation.

In this embodiment, the data acquisition unit 100 acquires a job 200 from, for example, the terminal 2, an external server, or the like, on the network 5 and stores it in the storage unit 19.

The unit estimation unit 110 calculates an estimation of the work for each specific unit of the job 200 acquired by the data acquisition unit 100 (hereinafter, simply referred to as a "unit estimation") and sequentially stores it as time-series data 310 in the estimated data 210 in the storage unit 19.

In the present embodiment, the unit estimation unit 110 calculates the estimation of consumption amount of the consumables such as toner and ink as a unit estimation for each page data 300.

The estimation analysis unit 120 detects the repetition and the repetition period from the unit estimation calculated by the unit estimation unit 110. In this embodiment, the estimation analysis unit 120 detects this repetition and period from the time-series data 310 of estimation data. The estimation analysis unit 120 stores the detected repetition and period in the repetition data 320 of the estimation data 210.

The entire estimation unit 130 estimates the work of the entire job 200 (hereinafter simply referred to as "entire estimation") based on the repetition and the period detected by the estimation analysis unit 120. The entire estimation unit 130 calculates an estimation of consumption amount of consumables for the entire job 200, that is, for all pages of the printed document as the entire estimation.

In this embodiment, the entire estimation unit 130 performs accurate estimation by estimating the work for the number of pages corresponding to the integer multiple of the detected period.

The estimation presentation unit 140 presents the estimation of the work calculated by the entire estimation unit 130. The estimation presentation unit 140 generates presentation data 220 including a confirmation screen, such as a graphical view of repetitions and periods stored in the repetition data 320, or the like, according to the update by the entire estimation unit 130, and it transmits the presentation data 220 to the terminal 2 for presenting.

In addition, in the present embodiment, the estimation presentation unit 140 presents a confirmation screen for confirming the repetition and period, and a graphical user interface (hereinafter referred to as "GUI"). This GUI may be able to confirm the period, two-dimensionally, by periodically arranging the thumbnail images. Further, the details of the confirmation screen are to be described later.

The job 200 is print data of a print document used for estimating work related to production printing. The job 200 may be written in JDF (Job Description Format) and/or JMF (Job Messaging Format) and may include various type file (s) such as PS (Postscript), PDF (Portable Document Format), PDL (Page Description Language), PPML (Personalized Print Markup Language) of the type of XML (Extensible Markup Language) format, or the like (hereinafter referred to as "PDF, or the like").

In this embodiment, the job 200 is configured as a plurality of units of copies (hereinafter simply referred to as a "copy"). This "copy" may be data for variable data printing in which the content of a document, image, or the like, changes in each "copy" instead of simply repeating.

Here, in this embodiment, the job 200 includes a plurality of page data 300.

The page data 300 includes data performed RIP (Raster Image Processor) processing (hereinafter, referred to as "rasterize") on a page unit. In this embodiment, the amount of printing work, for example, the consumption amount of consumables, or the like, differs for each page data 300 unit. The page data 300 may also be configured as PDF, or the like.

Here, the job 200 may be data including all pages of a print document, or it may be sample data of the print document for an estimation.

Even if the job 200 includes all the pages of the print document, the user may set the number of pages to be analyzed the repetition (the number of pages to be analyzed) when performing the unit estimation.

If the job 200 is the sample data of the print document, it may include data of a sufficient number of pages for estimation, but the number of pages may be much smaller than the original number of pages of the print document. In this case, for example, the job 200 may be data including 100 pages to several 100 pages of page data 300 for the print document in which the page number is 100,000 pages.

The estimation data 210 is data of an entire estimation. The estimation data 210 may include unit estimation data and entire estimation data.

In this embodiment, the estimation data includes time series data 310 and repetition data 320.

The time-series data 310 is data in which the data of the unit estimation calculated by the unit estimation unit 110 is replaced or changed with the consumption amount per time and stored. That is, the time-series data 310 stores values of the unit estimations, which time (t) is as the page position (m-th page) of the page data 300. In this embodiment, the time-series data 310 includes the consumption amount of consumables for each page.

Further, in the present embodiment, the time-series data 310 may include unit estimation data for the set number of pages for estimation or unit estimation data for all pages of the document sample.

The repetition data 320 is data that stores the repetition and the period detected from the time-series data 310 by the estimation analysis unit 120. The repetition data 320 also stores the number of input pages, which is the number of pages in the time-series data 310. Furthermore, the repetition data 320 also stores the largest number of pages that is an integer multiple of the detected period (hereinafter referred to as "maximum number of integer multiple pages") that is less than or equal to the number of input pages.

The presentation data 220 is image data generated by the estimation presentation unit 140 and presented on the terminal 2, or the like. The presentation data 220 includes, for example, the graphical view of the repetition and the period, or the like. Alternatively, the presentation data 220 may be a confirmation screen in which thumbnail images are arranged for confirmation of the repetition and the period. The thumbnail image may be an image that page data 300 are performed rendering and reduced.

Here, the control unit 10 of the image forming apparatus 1 executes the control program stored in the storage unit 19 to be function as the data acquisition unit 100, the unit estimation unit 110, the estimation analysis unit 120, the entire estimation unit 130, and the estimation presentation unit 140.

Further, each unit of the image forming apparatus 1 as described above serves as a hardware resource for executing the work estimation method of the present disclosure.

A part or any combination of the functional configurations described above may be configured in terms of hardware or circuits by using an IC, programmable logic, FPGA (Field-Programmable Gate Array), or the like.

[Work estimation process by Image Forming Apparatus 1]
Next, with reference to FIGS. 3 to 9, a work estimation process by the image forming apparatus 1 according to the embodiment of the present disclosure is described.

Figure 3:
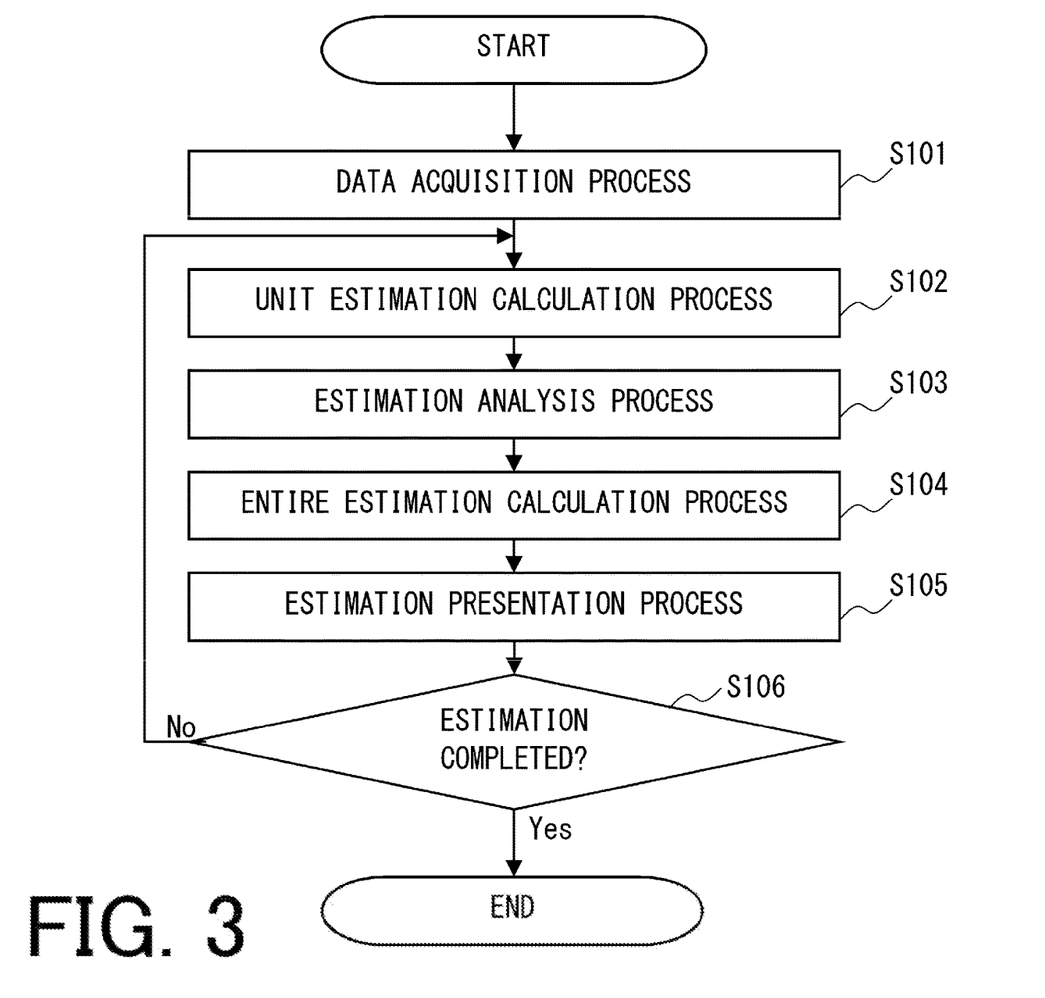
FIG. 3 is a flowchart of a work estimation process according to the embodiment of the present disclosure.

In the work estimation process according to the present embodiment, the job 200 for estimation is acquired according to an instruction from the terminal 2, or the like. Then, a unit estimation for the acquired job 200 is calculated and stored as the time-series data 310. Based on the stored time-series data 310, the repetition and the period of the repetition are detected. Then, the entire estimation for the job 200 is estimated based on the detected repetition and period. Further, it presents the entire estimation that is estimated.

In the work estimation process according to this embodiment, the control unit 10 executes a program stored in the storage unit 19 in cooperation with each unit by using hardware resources.

With reference to the flowchart of FIG. 3, the details of the work estimation process according to the present embodiment is described step by step as follows.

(Step S101)
Firstly, the data acquisition unit 100 performs data acquisition process.

The data acquisition unit 100 acquires the job 200 for work estimation from, for example, the terminal 2, an external server on the network 5, or the like, and stores it in the storage unit 19.

Thereafter, in the present embodiment, the data acquisition unit 100 acquires an instruction for estimating the work from the web browser of the terminal 2 or dedicated application software (hereinafter referred to as "application").

Then, the data acquisition unit 100 starts estimating the work. In this embodiment, the consumption amount of consumables such as toners, inks, or the like, for CMYK is estimated.

(Step S102)
Here, the unit estimation unit 110 performs unit estimation calculation process.

The unit estimation unit 110 calculates a unit estimation for each page data 300 stored in the storage unit 19 by using the page data 300 of the job 200 as the specific unit. That is, in the present embodiment, the unit estimation unit 110 calculates the estimation of consumption amount of consumables for each page data 300 of the job 200.

Specifically, the unit estimation unit 110 calculates, for example, each consumption amount of consumables as a unit estimation.

Here, when the page data 300 is in the state of PDF, or the like, the consumption amount cannot be estimated. Therefore, the unit estimation unit 110 once rasterizes the page data 300. At this time, the unit estimation unit 110 can count the number of pixels, or the like, included in the rasterized image data to calculate each consumption amount of the consumable to be used.

The unit estimation unit 110 stores the value of each consumption amount, which is the unit estimation for each page, in the time-series data 310 of the estimation data 210.

The unit estimation unit 110 does not output the rasterized image data from the image forming unit 17 when estimating the work. However, in the present embodiment, the unit estimation unit 110 also stores thumbnail image data, which the rasterized image data are reduced, in the time-series data 310. The unit estimation unit 110 may store unit estimation data for the number of pages set by the user, or time-series data 310 for all pages of the manuscript sample. In addition, the unit estimation unit stores the number of pages of the unit estimation included in the time-series data 310 as the number of input pages in the repetition data 320 of the estimation data 210.

(Step S103)
Then, the estimation analysis unit 120 performs estimation analysis process.

The estimation analysis unit 120 acquires the time-series data 310 of the estimation data stored in the storage unit 19, and it detects the repetition and the period of the repetition.

In the present embodiment, the estimation analysis unit 120 performs frequency conversion with the page direction as the time axis as an estimation of the work for each page data 300. This makes it possible to detect periodicity even if variations are included. As this frequency conversion, spatial frequency conversion, time frequency conversion, Discrete Fourier Transform, or the like, can be used. Alternatively, other transforms such as discrete cosine transform, wavelet transform, or the like, may be used as the frequency transform.

The estimation analysis unit 120 stores the calculated repetition of the time-series data 310 and its period in the repetition data 320 of the estimation data 210.

Here, with reference to FIGS. 4 to 8, the details of the estimation analysis process are described.

Figure 4:
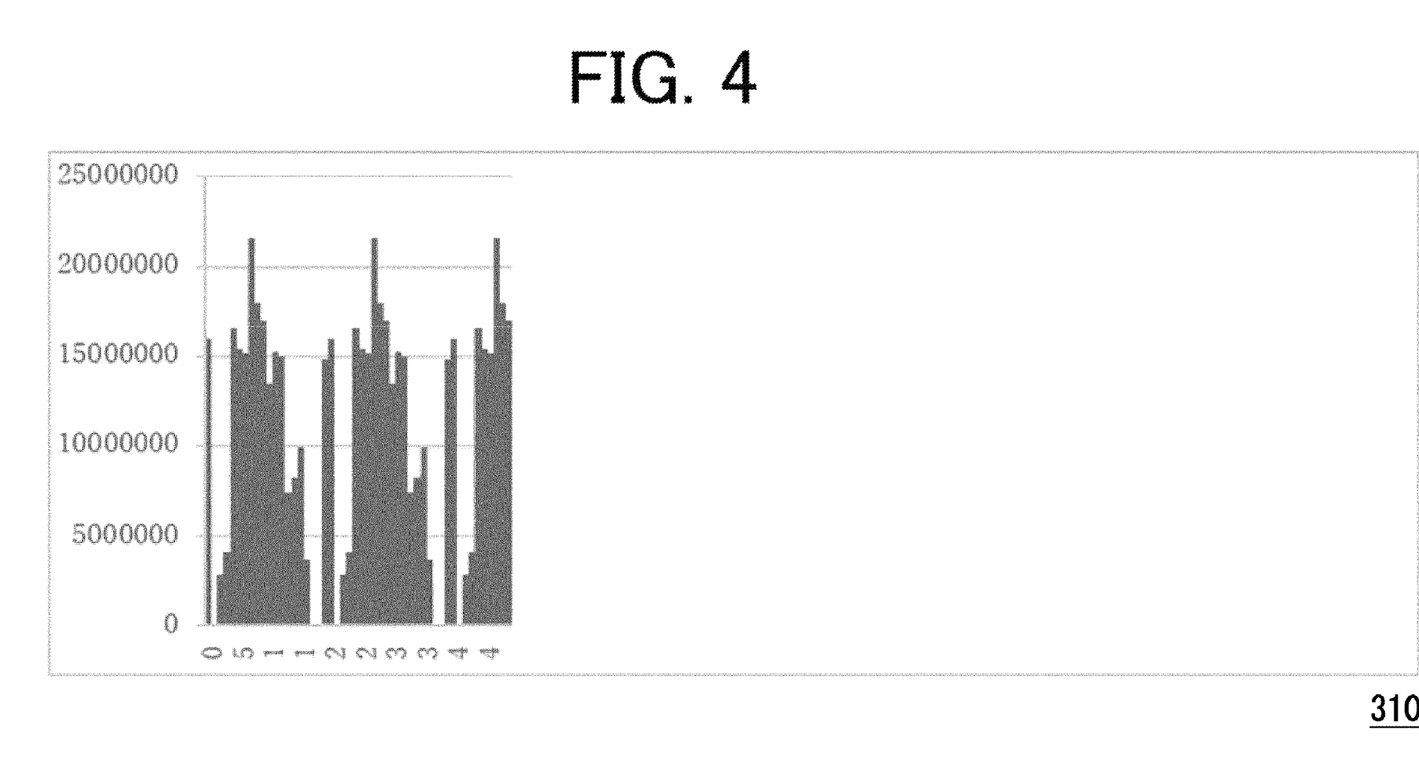
FIG. 4 is a conceptual diagram showing an example of accumulating 50 pages of time-series data in the work estimation process as shown in FIG. 3.

FIG. 4 shows an example of the time-series data 310 when the unit estimation is performed on print document data for general commercial printing. The time-series data 310 in this example includes unit estimation data for the estimated number of pages set by the user or for all pages of the manuscript sample. Here, an example in which the number of pages included in the time-series data 310 (the number of input pages) is 50 pages is described. That is, in this example, the unit estimation is performed only the page data 300 of fifty pages (N=50) from the top of the job 200. According to the numerical pattern of the unit estimation in FIG. 4, it is clear that a "copy", which is the copy printing of 20 pages is appeared in this time-series data 310 and the repetition of such "copy" for a plurality of times is included. By using the repetition and its period in this way, as described later in detail, the entire estimation can be calculated.

Here, in the example of the time-series data 310 in FIG. 4, the number of input pages is set to 50 pages as the number of pages that can be easily handled by the user (hereinafter referred to as a "well-defined number").

However, in the example of FIG. 4, the number of input pages of the time-series data 310 is not an integer multiple of the actual period. That is, although the time-series data 310 of FIG. 4 includes a plurality of repetitions, the number of input pages is 50, which is not an integer multiple of the repetition period of 20 pages, but it is 2.5 times. For this reason, in the example of FIG. 4, the unit estimation data for 0.5 period, which is less than the period of 20 pages, (hereinafter referred to as "fractional part") remains in the subsequent page as in the right side. The fractional part of this 0.5 period may not exactly be half of the consumable amount for one period.

For example, if consumption is high in the first half of one period and low in the second half, and the consumption amount of consumables for all pages of the printed document is estimated by including this fraction in the calculation, the estimation is to be calculated larger than the actual result.

Figure 5:
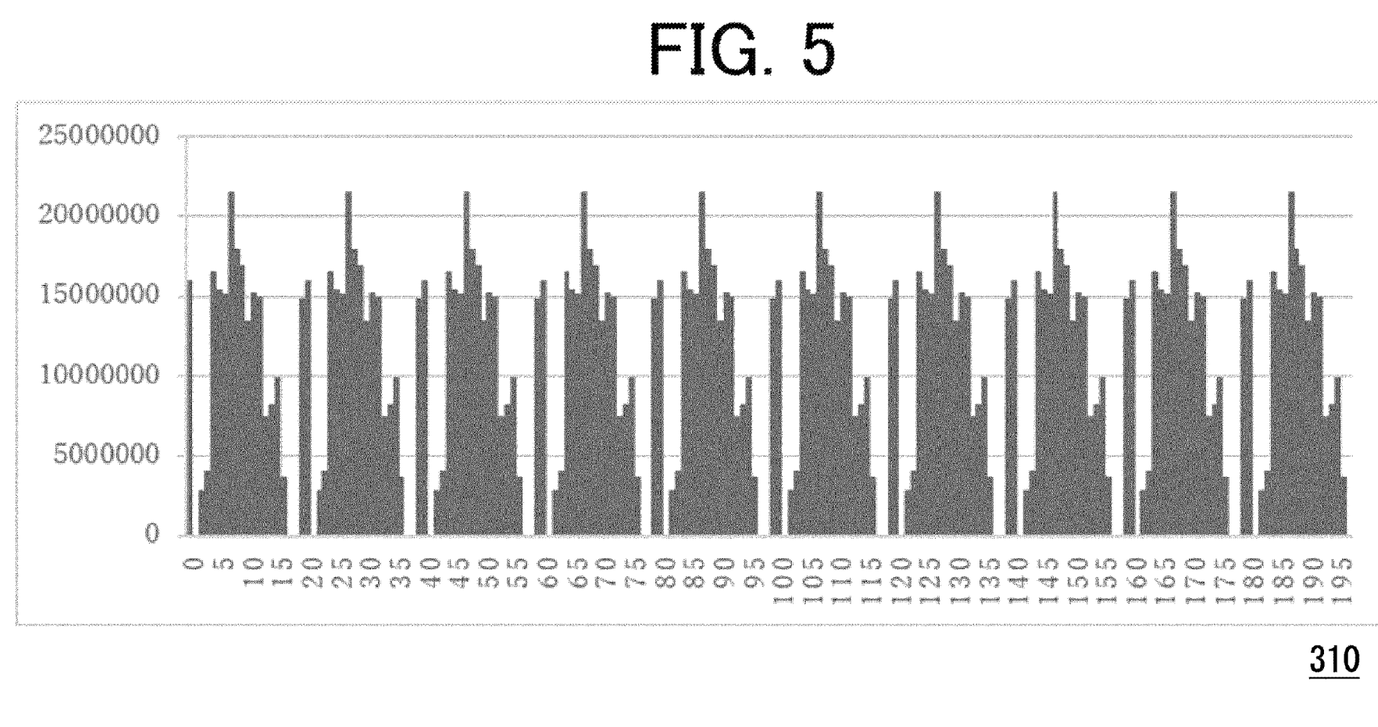
FIG. 5 is a conceptual diagram showing an example of time-series data for the entire job in the work estimation process as shown in FIG. 3.

FIG. 5 shows an example of the time-series data 310 in which the unit estimation is performed for all pages of the print document of the job 200. Here, the "copy" of 20 pages is repeated even if exceeding 50 pages, which has been the number of input pages, can be confirmed. Therefore, as described above, if the entire estimation is performed with including the fraction part, there is a deviation from the actual estimation.

Figure 6:
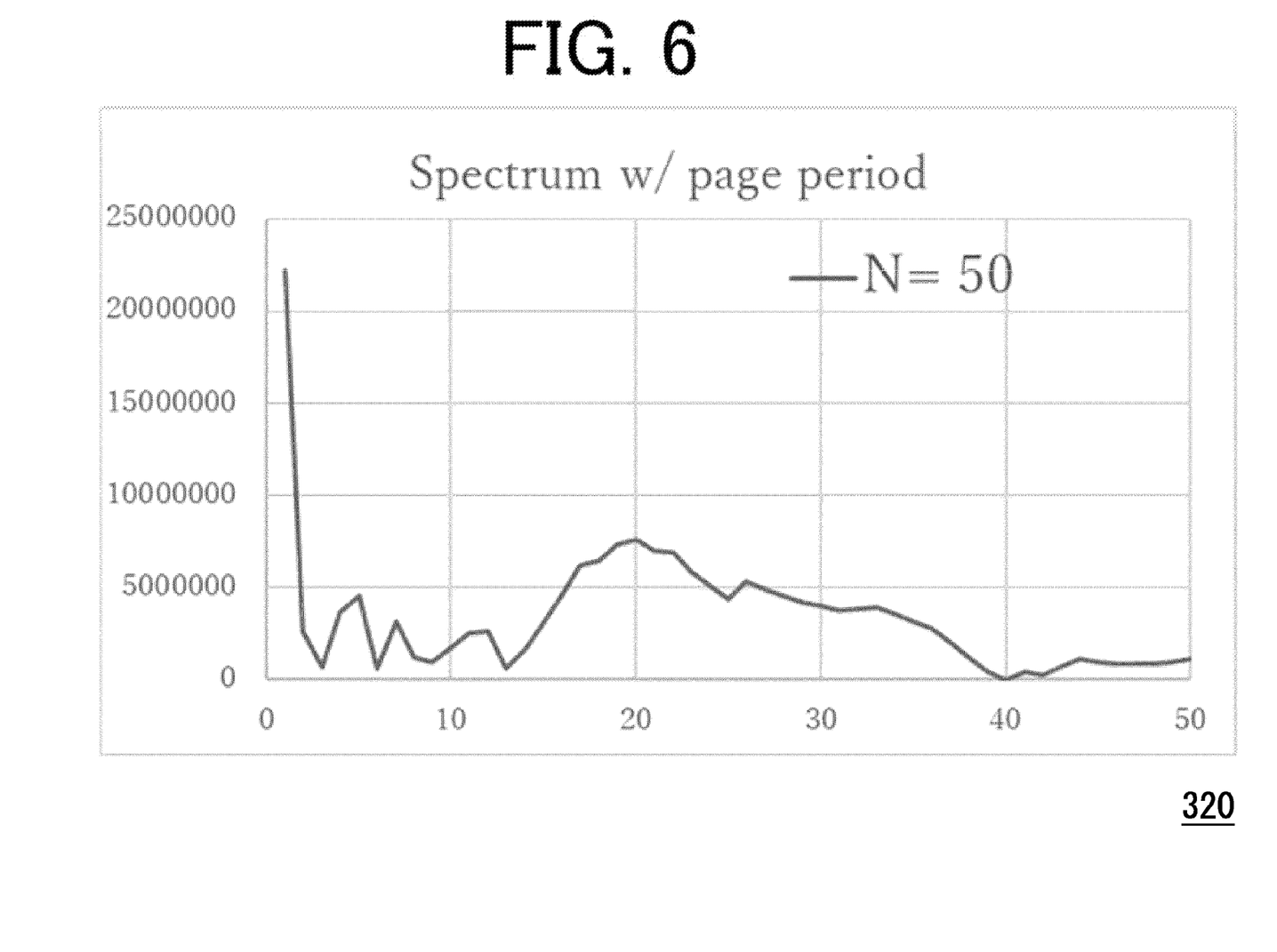
FIG. 6 is a graphical view showing an example of repetitive data detected in 50 pages in the work estimation process as shown in FIG. 3.

FIG. 6 shows an example of repetition data 320 when the estimation analysis unit 120 detects the repetition and its period for the time-series data 310 with 50 input pages (N=50).

Thereby, time-frequency transform is used to detect periodic components. For the available time-series data 310, the estimation analysis unit 120 replaces the consumption amount per page with the consumption amount per time, performs the time Discrete Fourier Transform, and uses the calculated frequency spectrum placed as the period.

In FIG. 6, there is a maximum value at the position of 20 pages as the period can be confirmed as described above. In this example, even if the number of analysis pages of the time-series data 310 is set to any of 40 to 59 pages, the maximum value is observed at 20 pages.

Figure 7:
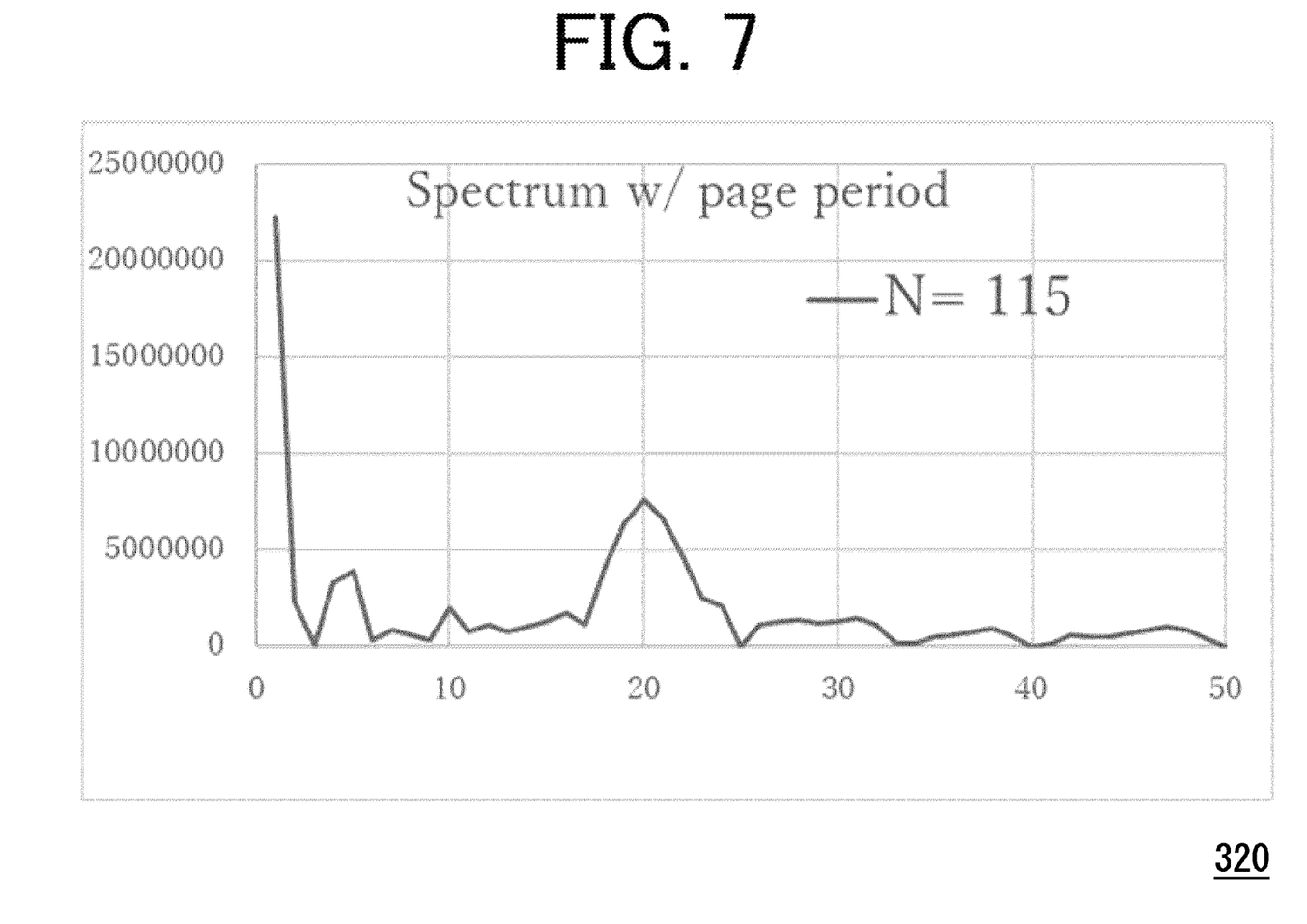
FIG. 7 is a graphical view showing an example of repetitive data detected in 115 pages in the work estimation process as shown in FIG. 3.

FIG. 7 shows an example of repetition data 320 for the same job 200 when the number of input pages of the time-series data 310 is 115 pages (N=115). That is, FIG. 7 shows an example in which the number of pages to be analyzed is increased to 115 pages. Thus, when the number of analyzed pages is increased, the maximum value appears more prominently at the position of page 20 as mentioned above. In other words, if the number of pages to be analyzed is increased, the detection of the period becomes more conspicuous. However, it is preferable to set in consideration of time and computational resources.

(Step S104)

Then, the entire estimation unit 130 performs entire estimation calculation process.

In the present embodiment, the entire estimation unit 130 estimates and calculates the entire estimation.

Specifically, when the unit estimation is performed only for the page data 300 of the first N pages in the job 200, the entire estimation unit 130 uses the unit estimation for an integer multiple of the period stored in the repetition data 320 to perform the entire estimation. That is, the entire estimation unit 130 uses a part of the time-series data 310 by using the calculated repetition and its period so that the above-described fractional part is not included. Specifically, the entire estimation unit 130 performs the entire estimation by using the number of pages that is the maximum integer multiple of the period (hereinafter referred to as the "maximum integer multiple page number") as the number of pages to be analyzed.

Figure 8:
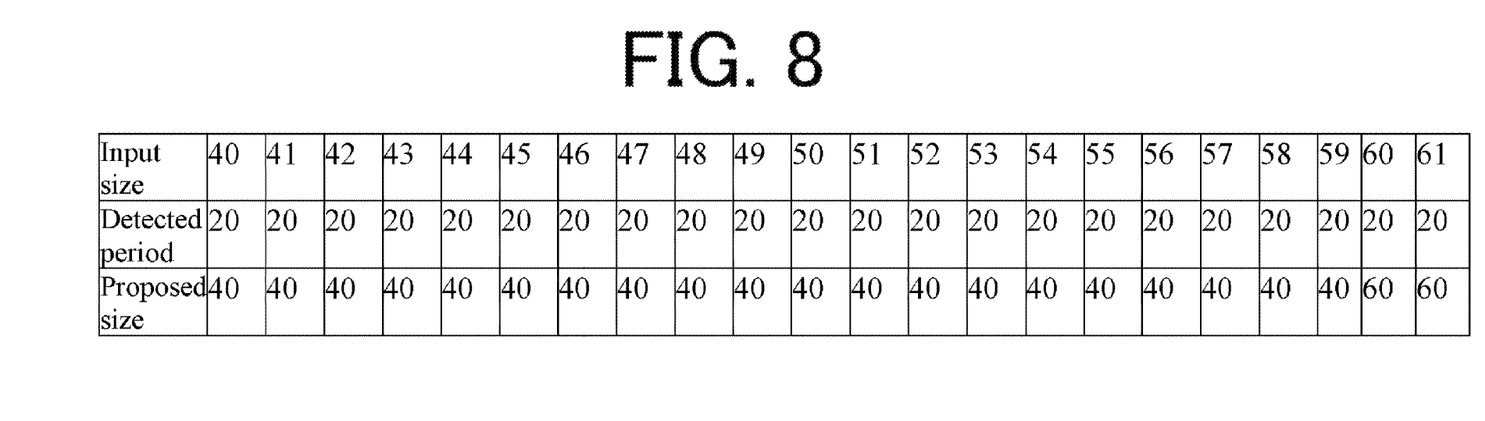
FIG. 8 is a graphical view showing an example of period and number of pages proposed from repetitive data in the work estimation process as shown in FIG. 3.

FIG. 8 shows a table showing an example of the number of input pages (Input size), the detected repetition period (Detected period), and the proposed number of pages (Proposed size) in which the maximum integer multiple page number as above is proposed as the analysis pages.

If the number of input pages is 50 pages as in the above example, the entire estimation unit 130 sets the number of pages to be analyzed to 40 pages as the maximum integer multiple page number, as shown in this table. Then, the entire estimation unit 130 performs the entire estimation by using the unit estimation data for 40 pages in the time-series data 310.

In addition, at the top of the page data 300 of the job 200, there is a possibility that a banner page including a front cover, a management banner, or the like, which is also the top of the entire print document, exists. Since the banner page appears only once at the beginning of the entire manuscript, if it is included in the calculation target of the estimation of the consumables, the error may become large. Specifically, since the banner page is often simple, the estimation may be calculated as smaller than it actually is.

Therefore, in practice, the entire estimation unit 130 may detect the location of the banner page by performing pattern matching, or the like, based on the repetition period. After that, the entire estimation unit 130 performs an entire estimation by using the above-described maximum integer multiple page number from the location next to the detected banner page in the time-series data 310. After that, the entire estimation unit 130 adds the unit estimation of the location of the banner page, thereby enabling a more accurate entire estimation.

(Step S105)

Here, the estimation presentation unit 140 performs an estimation presentation process.

The estimation presentation unit 140 generates presentation data 220 by adding graphical view of the repetition and the period, or the like, to the entire estimation values of the estimation data 210 calculated by the entire estimation unit 130. Alternatively, the estimation presentation unit 140 may generate presentation data 220 including a confirmation screen in which thumbnail images are arranged according to the period. Among these, which of these presentation data 220 is to be generated can be switched by a user's instruction by using a GUI, or the like, displayed on the terminal 2, the operation panel unit 16, or the like.

Further, the estimation presentation unit 140 transmits the drawn presentation data 220 to the terminal 2, or the like, displays it on the screen of the web browser or dedicated application, and further receives the operation of the input unit by the GUI.

More specifically, in the present embodiment, the estimation presentation unit 140 may generate the presentation data 220 in which graphical view of the analysis results of the repetition and its period as shown in FIGS. 6 and 7 are added to an image showing the entire estimation.

Alternatively, the estimation presentation unit 140 may generate a confirmation screen for confirming the repetition and the period as the presentation data 220. The confirmation screen may be a screen in which thumbnail images are arranged based on the detected repetition and its period. Furthermore, the estimation presentation unit 140 can also provide a GUI that can change the repetition and the period on the confirmation screen.

Figure 9:
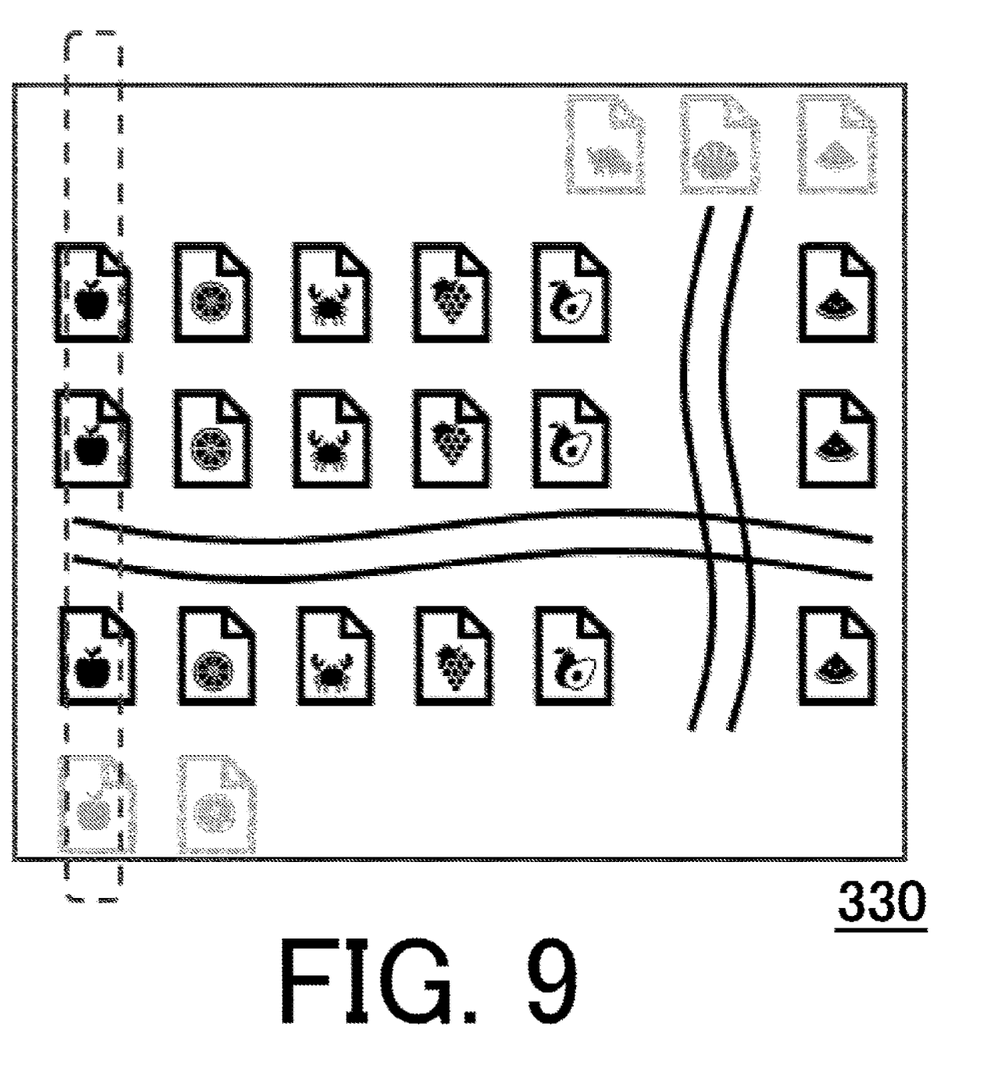
FIG. 9 is a screen example showing an example of presentation data generated as a confirmation screen in the work estimation process as shown in FIG. 3.

With reference to FIG. 9, an example of the confirmation screen and its GUI among the presentation data 220 is described.

The estimation presenting unit 140 presents the confirmation screen for two-dimensionally confirming the repetition and the period. Further, the estimation presenting unit 140 provides the GUI that can change the repetition and the period on the confirmation screen.

In the present embodiment, the result of the analysis of the repetition and its period is presented to the user as a suggestion or an initial value. The user can just confirm or modify the correct period to use it for the final entire estimation.

In the example of the confirmation screen in the presentation data 220 as shown in FIG. 9, the period of the print document is simply presented, and the user is asked to confirm. Furthermore, the period can be corrected by using the GUI.

In this example, the periodicity is expressed by arranging them two-dimensionally so that the repetition is easy to understand. Specifically, the estimation presentation unit 140 two-dimensionally draws a thumbnail image of "copy" that is expanded in the horizontal direction so that the head is located at the left end.

Here, the estimation presenting unit 140 renders this two-dimensional display according to the following rules:

- Firstly, the thumbnail image (s) of the location of the banner page is displayed, for example, to be grayed out so as not to be conspicuous. By changing the display in this way, it is shown that the user does not need to pay attention, and the user can easily understand.
- The location of the banner page can be changed by drag of the GUI to move the thumbnail images of all the document pages forward or backward.
- The plurality of "copies" is arranged with their tops aligned so that the horizontal direction (or the vertical direction) as matching the detected period.
- At the ends in the vertical direction (or the horizontal direction), the fractional part without periodicity is arranged. The thumbnail images of the fractional part may also be grayed out.
- If all thumbnail images of "copies" do not fit on the confirmation screen, an omission part is drawn as indicated by a wavy line as shown in FIG. 9. The omission parts may be drawn in both horizontal and vertical directions. Also, the omission part may be movable by drag-and-drop of the GUI.
- Alternatively, instead of displaying the omission part, the thumbnail images may be displayed in a small size as the entire display, and a spot thereof may be enlarged. For example, on the GUI, the spot specified in the entire display may be drawn as an enlarged part as like a magnifying glass, and this enlarged part may be movable.
- The horizontal position and the vertical position can be moved by using the GUI. In this example, the entire thumbnail image in the confirmation screen can be moved to the right or left without changing the period. Specifically, movement in both the horizontal direction and the vertical direction may be enabled by using forward/backward keys (buttons) of the terminal 2 or the input unit of the operation panel unit 16.
- The GUI may allow the user to change the period. For example, the period can be changed by dragging, or the like, the thumbnail image while pressing the shift key. Alternatively, if the period is not correct and an oblique pattern is visible, the period may be changed by, for example, moving the dotted line in the figure. This makes it possible to cause the pattern look like vertical stripes by arranging each row as a similar document.
- The GUI may be used to change the screen size of the confirmation screen and expand or shrink the frame in which the thumbnail images are drawn. Alternatively, it may be possible to fix the upper left position of the confirmation screen and move the window position on the GUI.

After the confirmation, if the repetition, its period, the location of the banner page, or the like, are changed by the user, the estimation presentation unit 140 may execute the same process as the entire estimation calculation process as described above. As a result, the entire estimation in the estimation data 210 is updated.

(Step S106)

Then, the estimation presentation unit 140 determines whether or not the estimation has been completed. The estimation presentation unit 140 determines Yes if the unit estimation is completed for all the page data 300. Alternatively, the estimation presentation unit 140 also determines Yes if the user instructs completion of confirmation by the GUI on the confirmation screen as described above. Furthermore, in case that the number of input pages is increased and the analysis is performed, if the user decides to discontinue the unit estimation in the middle according to the progress of the unit estimation of the work, it is also determined as Yes. The estimation presentation unit 140 determines No in other cases.

In the case of Yes, the estimation presentation unit 140 completes the work estimation process.

In the case of No, the estimation presentation unit 140 returns the process to step S102 to continue the process, and analyzes the repetition and its period, generates the entire estimation data 210, confirms the process, and the like.

With the above, the work estimation process according to the embodiment of the present disclosure ends.

As configured in this way, the following effects can be obtained.

As for the estimation of the consumption amount of consumables, since the consumption amount cannot be estimated in the state of PDF, or the like, rasterization may be once performed.

In such case by a typical technique, the entire job is rasterized for estimation. That is, since entire job is processed, the estimation itself consumes a lot of time and computational resource costs.

Here, print documents for production printing usually have periodic elements in a unit of "copy". In this case, each "copy" is similar, although it may not be exactly the same. However, about a job that includes the entire print document, if the number of input pages is set for several tens of pages from the beginning from the viewpoint of "well-defined number", the number of input pages may not be an integer multiple of the "copy". On the other hand, the document sample of the print document provided for the estimation of the work is usually a part of the entire print document. Also in this case, the document sample does not always have the number of pages that is an integer multiple of the "copy".

If the estimation of the work with the number of pages to be analyzed that does not match the period and does not be the integral multiple of "copy", the entire estimation of the entire print document by equally proportional this, a difference is arisen as compared with performing the entire estimation for all pages of the original print document. In the other words, if the work fee is estimated based on the number of pages to be analyzed, which is not set to an integer multiple, the results may be obtained quickly, but there is a high possibility that the accuracy is come a problem.

However, determining how many pages to estimate was difficult for users, and thus the user could easily make a simple mistake.

This is because when the content of the print document changes due to variable data printing, or the like, there may not be exactly the same repetition, and thus, setting rules for determining similarity is difficult. In other words, even if determination is made by brute force, similarity cannot be found, or wrong results are obtained.

Therefore, there is a demand for a technique that enables an objective determination of the estimation of the work and an accurate estimation of the work without having to perform an entire estimation for all pages of the print document.

On the other hand, the image forming apparatus 1 according to the present embodiment is an information processing apparatus performing estimation of the work related to printing, including: a data acquisition unit 100 that acquires a job 200 for estimation; a unit estimation unit 110 that calculates an estimation of the work for each specific unit of the job 200 acquired by the data acquiring unit 100; an estimation analysis unit 120 that detects repetition and a period of the repetition from the estimation of the work for the specific unit at the time calculated by the unit estimation unit 110; an entire estimation unit 130 that estimates an estimation of the work for the entire job 200 based on the repetition and the period detected by the estimation analysis unit 120; and an estimation presentation unit 140 that presents the estimation of the work calculated by the entire estimation unit 130.

With this configuration, when estimating the work for the entire print document by processing only a part of the print document, the repetition and its period included in the part of the print document are detected. As a result, the period can be easily and quickly calculated from a document whose periodicity is unknown without looking at the image, and based on this, the estimation of the work can be calculated, accurately. In addition, even if the document sample provider does not tell the number of pages in the "copy", an accurate estimation can be made. Therefore, the user can make the objective determination for judging, or the like, the price of the consumables without actually printing and verifying, or the like, the data in the job 200 one by one.

In the image forming apparatus 1 according to the present embodiment, the estimation of the work is an estimation of consumption amount of consumables.

With this configuration, the estimation of the consumption amount of consumables such as toner and ink, or the like, can be performed more accurately. Therefore, costs for customers and users in production printing can be suppressed.

Also, in the image forming apparatus 1 according to the present embodiment, the entire estimation unit 130 performs the estimation of the work at an integer multiple of the detected period.

With this configuration, the estimation of the work is performed by using maximum integer multiple page number, which is equal to or less than the number of input pages and is an integer multiple of the detected period, as the number of pages to be analyzed. This makes it possible to perform the estimation of the consumption amount of consumables for the entire print document most accurately within the range of the given number of input pages.

Further, in the image forming apparatus 1 according to the present embodiment, the unit estimation unit 110 stores the unit estimation as the time-series data 310, and the estimation analysis unit 120 performs frequency-transforms the time-series data 310 to detect the repetition.

With this configuration, spatial frequency conversion, time-frequency transform, Fourier transform, or the like, are used in which the page direction is regarded as a time axis in order to detect the repetition and its period. This makes it possible to discover periodicity such as "copy" included in the job 200 even if it contains variations. That is, it can be applied to variable data printing, or the like, including images, for which periodicity cannot be detected simply by brute force pattern matching, or the like. In other words, it can be applied for a print document that does not repeat exactly the same content but whose content shows relatively large changes even if periodicity is observed.

Further, in the image forming apparatus 1 according to the present embodiment, the estimation presentation unit 140 presents a confirmation screen for two-dimensionally confirming the repetition and the period, and it provides a GUI that can change the repetition and the period on the confirmation screen.

With this configuration, the repetition and its period can be presented to the user for confirmation. In such case, by arranging thumbnail images of the print document, or the like, on the confirmation screen, the user can confirm the "copy", easily. On this basis, the user can simply confirm or change to the correct period by the GUI, and thus the repetition and its period can be fixed, easily. As a result, the error in the entire estimation can be suppressed. At this time, since the repetition and its period for confirmation are already arranged as candidates, the user can easily and quickly complete the work. Therefore, convenience can be improved.

Other Embodiments

In addition, in the above-described embodiment, an example is described that a digital printing MFP performs the estimation of the work.

However, the terminal 2 may be configured to estimate the work. In this case, a dedicated application for the terminal 2 may be used to estimate the work.

Alternatively, a configuration is also possible in which the work is estimated by a server connected via a network, an apparatus for preprinting that performs rasterization, or the like.

That is, the estimation of the work may be performed by using an apparatus other than the image forming apparatus 1 as the information processing apparatus. Further, in such case, in addition to the terminal 2 and the image forming apparatus 1, it is also possible to perform the estimation of the work as an information processing system including a server.

By configuring in this way, various configurations can be adapted.

Further, in the information processing apparatus according to another embodiment, the estimation analysis unit 120 may detect the repetition in the reverse order of the specific units in the job 200. Specifically, the estimation analysis unit 120 may perform the repetition detection of the time-series data 310 from the back to the top in the page position of the print document. In this case, the unit estimation unit 110 may calculate unit estimations from the page data 300 on the back side of the job 200 to the page data 300 on the top (beginning) side, that is, in reverse order, and store them as the time-series data 310. Thus, the repetition can be detected in the reverse order of the page order.

In this way, by detecting the repetition and its period in the reverse order of the time-series data 310, the influence of the location of the banner page on the detection can be suppressed. In other words, the location of the banner page, which is not the target of detection, can less likely be detected. Conversely, the repetition and its period can be detected, easily. Furthermore, in the case that the number of pages to be analyzed is changed as described above, if the local maximum value decreases, it can be easily detected that the banner page has been reached before performing pattern matching, or the like.

By configuring in this way, more accurate estimation of the work can be performed.

In addition, in the above-described embodiment, an example of greatly changing the number of pages to be analyzed is not described.

However, it can be configured to perform unit estimation in real time from the entire job 200 and update the time-series data 310 and the number of pages to be analyzed in real time. Thus, in real-time, the repetition and its period may be detected and updated.

By configuring in this way, while the user is giving an explanation, it is possible to increase the number of pages to be analyzed and estimate the work. In this case, if the user has time, he or she can obtain the estimation result of the entire estimation based on the more correct repetition and its period. Then, the user can proceed with negotiations effectively while looking sideways at the value of the updated display of the entire estimation and the cost estimated by the separately set formula.

Also, in these cases, the user can request the conclusion of a contract with a relatively high entire estimation, which has not yet been finalized estimation as in an unconfirmed state, to the customer who has made a quick decision. On the other hand, the user can use the value of the entire estimation, which has been refined over time, for the customer who wants to negotiate. Therefore, even if price reduction requests are repeated, effective response can be performed.

Further, in the above-described embodiment, the example in which the total estimation unit 130 calculates the total estimation by using the maximum integer multiple page number of the detected period as the number of pages to be analyzed has been described.

However, the entire estimation unit 130 does not use the maximum integer multiple page number as the number of pages to be analyzed but uses the detected period or the period, or the like, of the integer multiple thereof (hereinafter simply referred to as "integer multiple"). That is, the entire estimation unit 130 may calculate the entire estimation by using this integer multiple.

Further, the entire estimation unit 130 may calculate statistical analysis information such as the average and standard deviation of errors in the estimation of work for each period with the integer multiple of the number of pages to be analyzed. From this, for example, upper and lower limits of error may be estimated. Specifically, the estimation analysis unit 120 can calculates statistical analysis information by using, for example, statistical estimation and testing such as interval estimation of the population mean, other statistical models, various machine learning models (hereinafter simply referred to as a "model"). Also, the upper limit value and lower limit value included in this statistical analysis information may be, for example, upper limit and lower limit values calculated with a 95% confidence interval.

With this configuration, more accurate estimation can be performed. For example, the user can objectively judge by confirming the upper limit value and the lower limit value included in the statistical analysis information on the confirmation screen. Therefore, it is possible to contribute to prompt estimation during negotiations.

Further, in the above-described embodiment, an example of estimating consumables such as toner and ink are described as the estimation of the work related to printing.

However, the various type of estimations of printing work for executing job 200 with a large number of pages can be performed.

With this configuration, the objective judgments about various operations related to printing can be performed.

In the above-described embodiment, the difference of processing by the type of jobs 200 has not been described in the above embodiment. However, the detection processing can be changed depending on the type of print document to be output. Specifically, the number of pages to be analyzed, whether to detect repetition, and the like, may be changed.

For example, the setting may be changed between the printing of advertising leaflets, catalogs, insurance pamphlets, or the like, which are repetitive and printed in many colors, and the printing of ordinary book.

Furthermore, in the case of printing of ordinary book, processing may be performed such that repetition detection is not performed.

This makes it possible to calculate a more accurate estimation.

Furthermore, by the job 200, when printing all pages, number of copies, or page unit by using a plurality of printers, the estimation for each printer can be performed.

Also, the unit price and consumption of consumables may be calculated differently depending on whether the job 200 is for digital printing or for offset printing.

Also, the estimated unit price and other costs may be changed depending on the type of job 200, the number of pages, the presence or absence of post-processing, and the like.

By configuring in this way, it is possible to perform the estimation that is more convenient for the user.

Further, the configuration and operation of the above-described embodiment are examples, and needless to say, they can be modified and executed as appropriate without departing from the aim of the present disclosure.

What is claimed is:

1. An information processing apparatus performing estimation of work related to printing, comprising:
   a data acquisition unit configured to acquire a job for estimation;
   a unit estimation unit configured to calculate an estimation of the work for each specific unit of the job acquired by the data acquiring unit;

an estimation analysis unit configured to detect repetition and a period of the repetition from the estimation of the work for the specific unit at the time calculated by the unit estimation unit;

an entire estimation unit configured to estimate an estimation of the work for the entire job based on the repetition and the period detected by the estimation analysis unit; and an estimation presentation unit configured to present the estimation of the work calculated by the entire estimation unit;

wherein:

the entire estimation unit performs the estimation of the work at an integer multiple of the detected period.

2. The information processing apparatus according to claim 1, wherein:

the estimation of the work is an estimation of consumption amount of consumables.

3. The information processing apparatus according to claim 1, wherein:

the estimation analysis unit detects the repetition in reverse order of the specific unit in the job.

4. The information processing apparatus according to claim 1, wherein:

the unit estimation unit stores the estimation of the work for each specific unit as time-series data, and the estimation analysis unit frequency-transforms the time-series data to detect the repetition.

5. The information processing apparatus according to claim 1, wherein:

the estimation presentation unit presents a confirmation screen for two-dimensionally confirming the repetition and the period and provides a graphical user interface capable of changing the repetition and the period on the confirmation screen.

6. An image forming apparatus for estimating work related to printing, comprising:

a data acquisition unit configured to acquire a job for estimation;

a unit estimation unit configured to calculate an estimation of the work for each specific unit of the job acquired by the data acquiring unit;

an estimation analysis unit configured to detect repetition and a period of the repetition from the estimation of the work for the specific unit at the time calculated by the unit estimation unit;

an entire estimation unit configured to estimate an estimation of the work for the entire job based on the repetition and the period detected by the estimation analysis unit; and an estimation presentation unit configured to present the estimation of the work calculated by the entire estimation unit;

wherein:

the entire estimation unit performs the estimation of the work at an integer multiple of the detected period.

7. The image forming apparatus according to claim 6, wherein:

the estimation of the work is an estimation of consumption amount of consumables.

8. The image forming apparatus according to claim 6, wherein:

the estimation analysis unit detects the repetition in reverse order of the specific unit in the job.

9. The image forming apparatus according to claim 6, wherein:

the unit estimation unit stores the estimation of the work for each specific unit as time-series data, and the estimation analysis unit frequency-transforms the time-series data to detect the repetition.

10. The image forming apparatus according to claim 6, wherein:

the estimation presentation unit presents a confirmation screen for two-dimensionally confirming the repetition and the period and provides a graphical user interface capable of changing the repetition and the period on the confirmation screen.

11. A work estimation method executed by an information processing apparatus for estimating work related to printing, comprising the steps of:

acquiring a job for estimation;

calculating an estimation of the work for each specific unit of the job;

detecting repetition and a period of the repetition from the estimation of the work for the specific unit at the calculated time;

estimating an estimation of the work for the entire job based on the detected repetition and the period; and presenting the calculated estimation of the work;

wherein:

the estimating an estimation of the work for the entire job based on the detected repetition and the period comprises:

performing the estimation of the work at an integer multiple of the detected period.

12. The work estimation method according to claim 11, wherein:

the estimation of the work is an estimation of consumption amount of consumables.

13. The work estimation method according to claim 11, wherein:

the detecting repetition and a period of the repetition from the estimation of the work for the specific unit at the calculated time comprises:

detecting the repetition in reverse order of the specific unit in the job.

14. The work estimation method according to claim 11, wherein the method comprises:

storing the estimation of the work for each specific unit as time-series data, and frequency-transforming the time-series data to detect the repetition.

15. The work estimation method according to claim 11, wherein the method comprises:

presenting a confirmation screen for two-dimensionally confirming the repetition and the period, and providing a graphical user interface capable of changing the repetition and the period on the confirmation screen.

* * * * *